(12) United States Patent
Skaaksrud et al.

(10) Patent No.: US 8,955,046 B2
(45) Date of Patent: Feb. 10, 2015

(54) SYSTEMS AND METHODS FOR AUTHENTICATING DEVICES IN A SENSOR-WEB NETWORK

(75) Inventors: Ole-Petter Skaaksrud, Lakeland, TN (US); Miley Ainsworth, Hernando, MS (US)

(73) Assignee: FedEx Corporate Services, Inc., Collierville, TN (US)

( * ) Notice: Subject to any disclaimer, the term of this patent is extended or adjusted under 35 U.S.C. 154(b) by 161 days.

(21) Appl. No.: 13/351,861

(22) Filed: Jan. 17, 2012

(65) Prior Publication Data

US 2012/0216252 A1    Aug. 23, 2012

Related U.S. Application Data

(60) Provisional application No. 61/445,267, filed on Feb. 22, 2011.

(51) Int. Cl.
*H04W 12/06*     (2009.01)
(52) U.S. Cl.
CPC .................................... *H04W 12/06* (2013.01)
USPC ............................................................ 726/3
(58) Field of Classification Search
USPC ................................. 726/3, 30; 713/168, 170
See application file for complete search history.

(56) References Cited

U.S. PATENT DOCUMENTS 7,571,313 B2 *   8/2009   Messerges et al. ........... 713/156
8,266,357 B2 *   9/2012   Knowles et al. .............. 710/240

FOREIGN PATENT DOCUMENTS

| EP | 2 023 528 | 2/2009 |
| WO | WO 2006/071501 | 7/2006 |
| WO | WO 2009/042104 | 4/2009 |

OTHER PUBLICATIONS

International Search Report and Written Opinion dated Jun. 26, 2012, for Application No. PCT/US2012/023732 (10 pages).

* cited by examiner

*Primary Examiner* — Beemnet Dada
(74) *Attorney, Agent, or Firm* — Finnegan, Henderson, Farabow, Garrett & Dunner, LLP (57) ABSTRACT

There is provided a method for distributing sensor data. The method includes receiving, from a requesting device, a request to access first sensor-collectable data associated with at least one package. The requesting device is authenticated to access the first sensor-collectable data. And when second sensor-collectable data is associated with a predetermined value, the method also includes denying the request for access.

27 Claims, 7 Drawing Sheets

| Device | Authenticated Sensor Information |
|---|---|
| Device A | Temperature Humidity Audio Video Motion |
| Device B | Temperature Video |
| Device C | None |
| ⋮ | ⋮ |

SYSTEMS AND METHODS FOR AUTHENTICATING DEVICES IN A SENSOR-WEB NETWORK

RELATED APPLICATION

This application claims priority from U.S. Provisional Application No. 61/445,267, filed Feb. 22, 2011, the entire contents of which are hereby incorporated by reference in their entirety.

TECHNICAL FIELD

The present disclosure generally relates to the field of computerized systems. More particularly, the disclosure relates to computerized systems and methods for authenticating devices in a sensor-web network, such as a wireless mesh network.

BACKGROUND INFORMATION

A wireless mesh network is a communications network made up of radio nodes organized in a mesh topology. Wireless mesh networks often consist of mesh clients, mesh routers and gateways. The mesh clients may be wireless devices and the gateways may permit access to outside networks, such as the Internet. The mesh routers, meanwhile, may forward traffic between the mesh clients and the gateways. The coverage area of the radio nodes working as a single network may be called a mesh cloud. Access to the mesh cloud may be dependent on the radio nodes working in harmony with each other to create a radio network.

A mesh network may be reliable and offer redundancy. When one node can no longer operate, the rest of the nodes may still be able to communicate with each other, directly or through one or more intermediate nodes. Wireless mesh networks may be implemented with various wireless technology including 802.11, 802.16, cellular technologies or combinations of more than one type.

A wireless mesh network may be seen as a special type of wireless ad-hoc network. The mesh routers may be highly mobile and may have more resources as compared to other nodes in the network, such as the mesh clients. The mesh routers, therefore, may be used to perform more resource intensive functions. In this way, the wireless mesh network differs from an ad-hoc network in which the nodes are often constrained by resources.

In some cases, the nodes in the network are data-collection and storage devices, such as sensors. Because the sensors may be able to share the collected data, data security may be an issue. Accordingly, it may be necessary to implement systems and methods for protecting the sensor-collectable data.

SUMMARY

In accordance with the invention, there is provided a method for distributing sensor data, the method comprising: receiving, from a requesting device, a request to access first sensor-collectable data associated with at least one package, wherein the requesting device is authenticated to access the first sensor-collectable data; and when second sensor-collectable data is associated with a predetermined value, denying the request for access.

In accordance with the invention, there is also provided a computer-readable medium storing program instructions, which, when executed by a processor, cause the processor to perform a method for distributing sensor data, the method comprising: receiving, from a requesting device, a request to access first sensor-collectable data associated with at least one package, wherein the requesting device is authenticated to access the first sensor-collectable data; and when second sensor-collectable data is associated with a predetermined value, denying the request for access.

In accordance with the invention, there is also provided a device for distributing sensor data, the device comprising: an I/O unit configured to receive, from a requesting device, a request to access first sensor-collectable data associated with at least one package, wherein the requesting device is authenticated to access the first sensor-collectable data; and a processor configured to deny the request for access when second sensor-collectable data is associated with a predetermined value.

Additional aspects of the invention will be set forth in part in the description which follows, and in part will be obvious from the description, or may be learned by practice of the invention. The aspects of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one (several) embodiment(s) of the invention and together with the description, serve to explain the principles of the invention.

DETAILED DESCRIPTION

This disclosure generally relates to the collection and distribution of information collected from one or more sensors associated with a package in a delivery network. The sensors may used to collect information associated with packages. The collected information may be provided to requesting devices.

For purposes of this disclosure, a container or package may be a box, envelope or any other media used to ship documentation or products from one point to another. Goods are typically held in a container to form a package. Thus, a package can include one or more types of goods which require specific conditions during part or all of the transit process between the source and destination, including, for example, perishables or controlled substances. The particular shape or size of a package is not particularly important to this description. The delivery network may deliver packages of a variety of shapes and sizes.

The delivery network in one example comprises a network of transportation vehicles such as airplanes, trains, trucks and other means for transporting goods of any type. The delivery network may be used to collect packages from sources (for example, senders) and to deliver the packages to destinations (for example, recipients).

In one example, one or more sensors may be associated with a package; in other words, the one or more sensors may be placed within a package, attached to a package, or otherwise placed within a vicinity of the package. The sensor may be configured to collect particular types of information associated with the package and/or its contents. The placement of the sensor in relation to a package or the content of the package may be based on the type of information that the sensor is configured to collect. For example, this sensor-collectable information may include geographic location and/or other conditions associated with the package or its contents at any given time, including exterior and/or interior temperature of the package, humidity within or about the package, moisture levels within or about the package, altitude of the package, and any other conditions that sensors can collect.

The sensors may have transceivers, such as communication radios. In one example, the transceiver has selected components of cellular telephones that enable effective communication between sensors associated with packages and other devices while the packages are in transit. Other similar wireless and/or wire-line transmission configurations may be used in connection with this disclosure.

Disclosed embodiments may include a network, such as a mesh network, with a plurality of sensors or other devices, some or all of which are sharing information in a collaborative ecosystem. For example, a sensor may be located inside an insulated package and monitoring the internal temperature of the package. The sensor may, however, need temperature information from the outside of the package as well. Thus, the sensor may identify other nearby sensors to which it can connect and with which it can communicate. In some embodiments, the sensor may be able to connect to sensors located outside of the package, in order to acquire external temperature information. This is only one example, as devices can share many other types of collected information.

In other embodiments, a device that is not a sensor, such as a mesh router, may request sensor-collectable data from sensors to aggregate and analyze the collected data. For example, a mesh router in a delivery truck may be configured to collect temperature information from sensors associated with individual packages located throughout the truck to determine temperature topology of the truck, including for example temperature differences at the front versus the rear of the truck.

Because these various devices and sensors may share information, this disclosure discusses data access protocols to ensure that any requesting device seeking the collected information is properly authenticated as having permission. For example, disclosed embodiment may employ a server-side model of authentication for data access. This may also facilitate point-to-point identification of requesting devices, which may perform ping-like sweeps of nearby devices. If a nearby node responds, it may identify a unique identifier, such as the MAC address, of the requesting node. The responding node may authenticate the requesting device in part based on its unique identifier. Additionally, the responding node may take into account other factors in authenticating the requesting node, such as other collected sensor information.

This point-to-point system, in a mesh network for example, enables each communicating device to increase their data density without the overhead of additional devices needing to relay the collected information. This system may also simplify the integration needed to enable devices from multiple manufacturers to share information. These examples, of course, are not limiting, and one of ordinary skill would understand that the scope of the invention includes numerous embodiments.

Reference will now be made in detail to exemplary embodiments illustrated in the accompanying drawings. Wherever possible, the same reference numbers will be used throughout the drawings to refer to the same or like parts.

Figure 1:
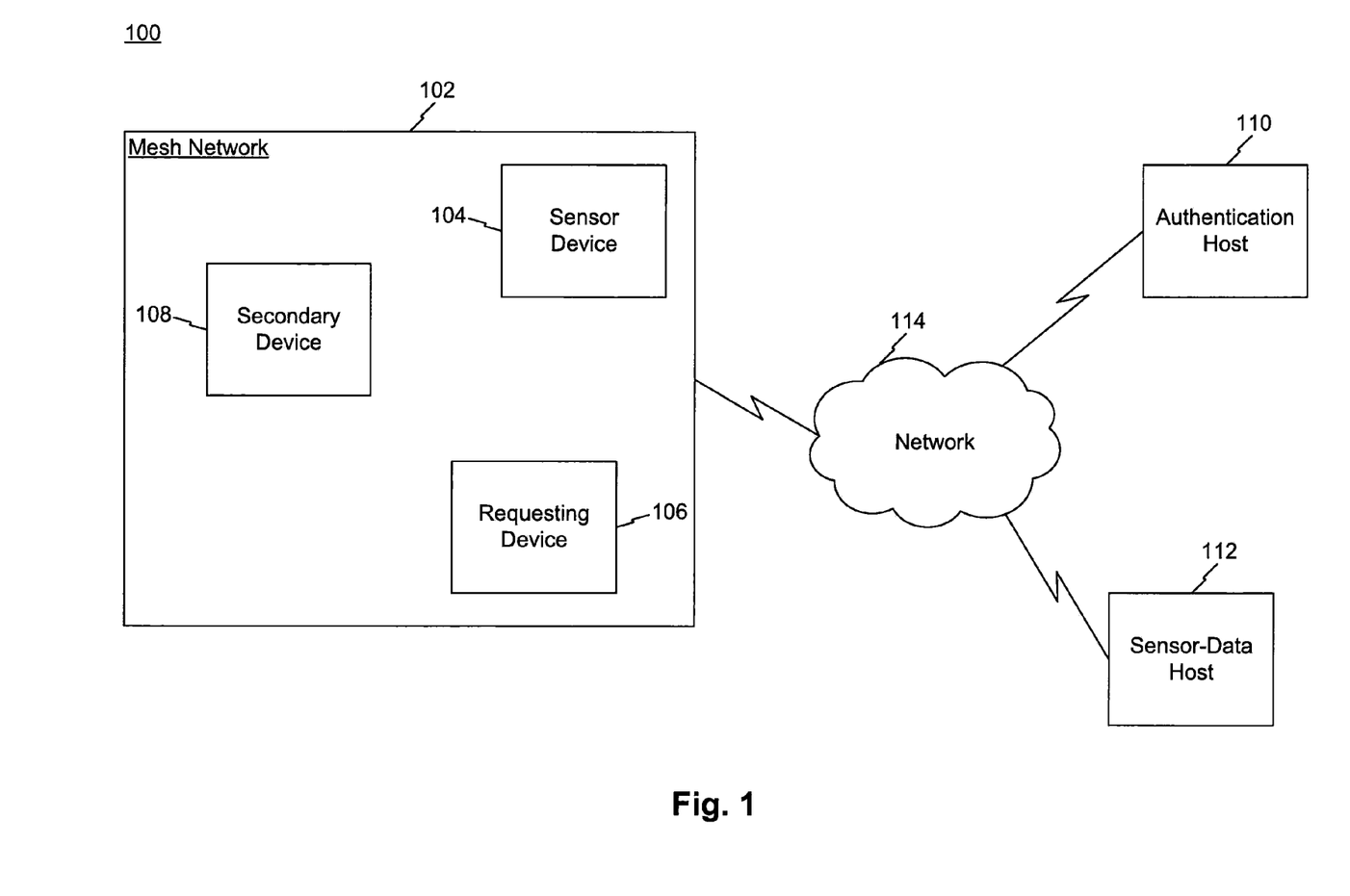
FIG. 1 illustrates an exemplary system for collecting data about an environment of a package.

FIG. 1 illustrates an exemplary system 100 for collecting data about an environment of a package. System 100 may include mesh network 102. Mesh network 102 may include a plurality of interconnected devices, such as sensor device 104, requesting device 106, and secondary device 108, as well as other devices not shown. Other embodiments may use a different type of network other than mesh network 102, such a local area network (LAN), wide area network (WAN), wireless, and/or wired network.

System 100 also may include Authentication Host 110 and/or Sensor-Data Host 112, which may be connected to mesh network 102 via network 114. Network 114 is configured to facilitate communications, such as among mesh network 102, authentication host 110, and/or sensor-data host 112. In addition, mesh network 102, authentication host 110, and/or sensor-data host 112 may access other systems or other entities via network 114, that are not shown in system 100. Network 114 may be a shared, public, or private network, may encompass a wide area or local area, and may be implemented through any suitable combination of wired and/or wireless communication networks. Furthermore, network 114 may comprise a local area network (LAN), a wide area network (WAN), an intranet, or the Internet. In some embodiments, mesh network 102, authentication host 110, and/or sensor-data host 112 may be directly connected, in whole or in part, instead of connected through network 114.

Mesh network 100 may include devices used in the delivery of packages. The devices may be used to track or analyze conditions in an environment of one or more packages during transit. For example, sensor device 104 may be located inside or near a package, and may collect data about environmental conditions, such as temperature, light level, motion, pressure, humidity, gas level, airflow, vibrations, radiation, time, audio, video, orientation, location, or other sensor-collectable data.

Requesting device 106 is also configured to collect data about environmental conditions about a package. Alternatively or additionally, requesting device 106 may analyze sensor-collectable data to prepare reports or to trigger actions or alerts based on the sensor-collectable data. In some embodiments, requesting device 106 may request data collected by sensor device 104. And in some embodiments, requesting device 106 may not include a sensor or collect data.

In one example, requesting device 106 may be located inside a partially insulated package. The contents of the package may be temperature dependent, and may be damaged if the temperature exceeds a certain amount. Requesting device 106, or some other device, may be able to trigger an alert if the temperature inside the package exceeds a threshold, or if it is in danger of exceeding the threshold. During transit, the package may be moved from truck to truck at a warehouse, and may be located outside or in a non-refrigerated container. Therefore, requesting device 106 may ping nearby sensors in an attempt to determine temperature information outside of the package. In this example, sensor device 104 may collect temperature information outside of the package, and requesting device 106 may request that outside temperature information. If the temperature outside of the package is very high, then requesting sensor 106 may determine that the package is in danger of exceeding the threshold temperature, and may trigger an alert.

Requesting device 106, or any other device, may also rely on historical information when analyzing conditions. For example, if the package is located outside at a certain time, requesting device 106 may need to know whether it can expect the temperature to increase or decrease and how long it can expect to wait outside. Requesting device 106 may obtain this historical information from a host, such as sensor-data host 112, either directly or through another device or host. For example, requesting device 106 may receive this historical information through sensor device 104.

In an environment in which sensor-collectable data is so easily shared, it may be necessary to implement authentication techniques, so that the sensor-collectable data cannot be shared with outside parties. Indeed, some sensor-collectable data may be confidential or propriety. Thus, in some embodiments, requesting device 106 may be required to authenticate itself in some way to sensor device 104 before receiving the sensor-collectable data.

Additionally, other devices in mesh network 100 may be configured to collect data from sensor 104. For example, secondary device 108 may utilize such data, but may retrieve the data from requesting device 106 instead of directly from sensor device 104. In some embodiments, requesting device 106 may serve as a proxy for secondary device 108.

When requesting device 106 requests sensor data from sensor 104, sensor 104 may authenticate requesting device 106 to ensure that it is allowed access to the sensor data. Sensor device 104 may perform this authentication locally, or may request that authentication host 110 perform the authentication. Authentication host 110 may then determine whether or not requesting device 106 should be authenticated, and may send this determination to sensor device 104.

Requesting device 106 may provide the location of sensor-data host 112 to sensor device 104. Thus, after sensor device 104 authenticates requesting device 106, it may send the requested sensor-collectable data to sensor-data host 112 for processing, storage, and/or analysis.

System 100 is one example configuration, and the number and distribution of the various entities shown may be different depending on specific embodiments. In some embodiments, authentication host 110 and/or sensor-data host 112 may be distributed over multiple entities, including other distribution systems, sensors, computers, handheld computers, mobile phones, tablet computers, or other computing platform. Thus, the configuration described in system 100 is an example only and is not intended to be limiting.

Figure 2:
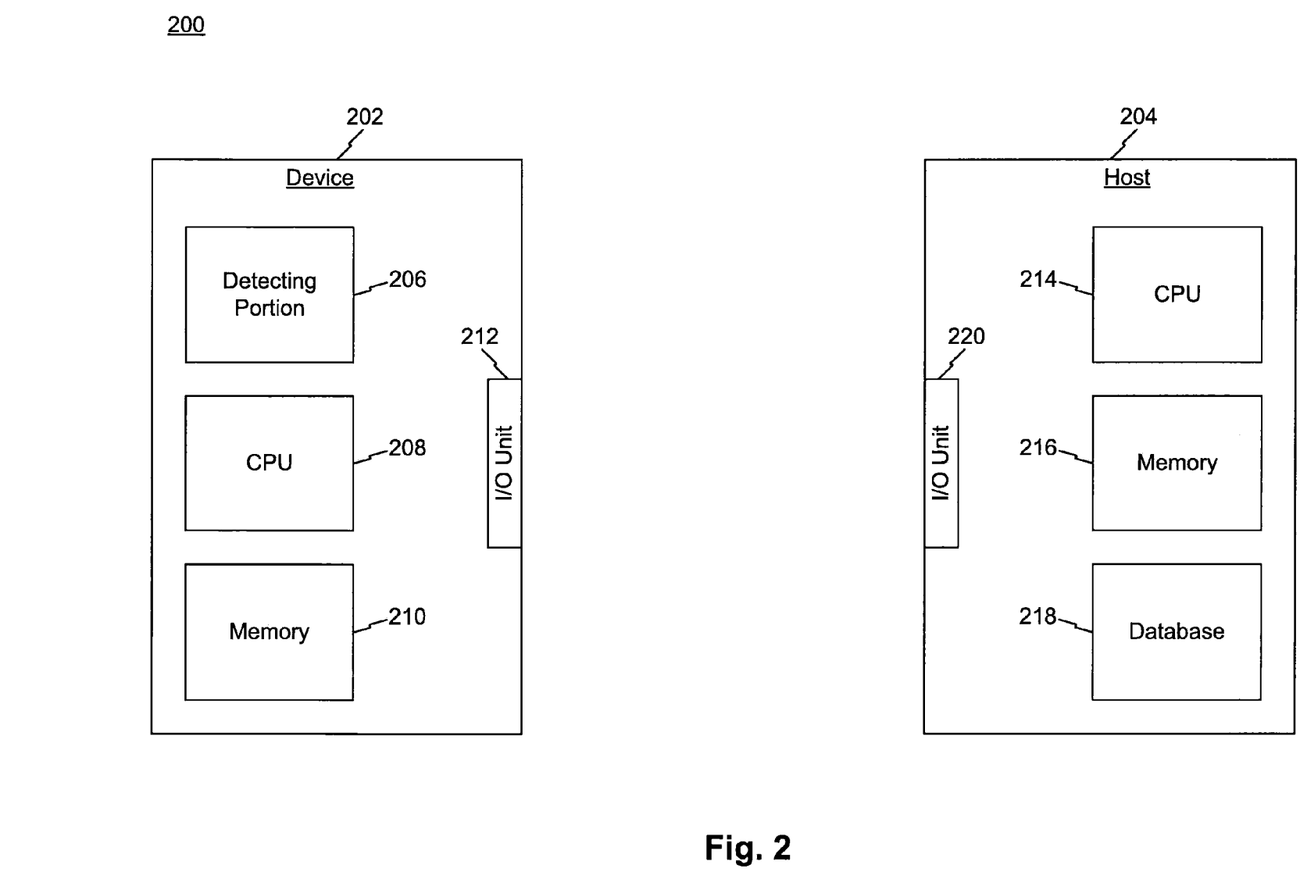
FIG. 2 is a block diagram illustrating exemplary devices and hosts used in disclosed embodiments.

FIG. 2 is a block diagram 200 illustrating a non-limiting example of devices and hosts utilized in some example system configurations. Block diagram 200 includes device 202 and host 204. Device 202 may correspond to sensor device 104, requesting device 106, and/or secondary device 108. And host 204 may correspond to authentication host 110 and/or sensor-data host 112.

Device 202 may include detecting portion 206, which may include one or more software and/or hardware components for collecting data about an environment of a package. In other words, detecting portion 206 may be some kind of sensor. For example, detecting portion 206 may collect location information about the package. In some embodiments, location information may include the use of a Global Positioning System (GPS). If GPS is used, detecting portion 104 may use the course acquisition code (C/A Code) utilized in GPS technology.

The location information may also be determined through cellular triangulation, wireless network association, the capture of fixed location scan, or the capture of mobile location scan. The fixed location and mobile location scans may use 1D or 2D barcodes, or Radio Frequency Identification (RFID). For example, device 202 may scan a barcode or read an RFID tag associated with a predefined location. Device 202 may be able to look-up the predefined location after the scan using a value associated with the barcode or RFID.

In international locations, multiple global navigational satellite systems may be available. Improved service may be provided by utilizing switching connections, similar to switching between multiple cellular networks. For example NaviStar (US), GLONASS (Russia) and other satellite systems may be available. Thus, detecting portion 206 may switch among different GPS providers when determining location information. Additionally, adding timing correction or differential GPS with satellite-based augmentation systems may improve the performance of systems in urban canyons and may improve accuracy down to the sub-meter.

In addition to or instead of location information, detecting portion 206 may collect other data related to a package and/or its content, for example, environmental conditions at any or a selected time. For example, detecting portion 206 may collect data about temperature, light level, motion, pressure, humidity, gas level, airflow, vibrations, radiation, time, audio, video, or other environmental conditions. During transit, the environment of some packages may need to be within certain parameters, such as within a certain temperature, pressure, or humidity range. Other information like time, audio, or video may be relevant to determining the circumstances of delivery of the package.

For example, detecting portion 206 may include a camera configured to record still images or video of a person accepting the package upon delivery, or upon arrival at an intermediate destination, like a processing center. The detecting portion 206 may also record audio using an audio recorder or determine a time using an internal clock. Thus, disclosed embodiments may use different types of sensors configured to collect different types of environmental data. In some embodiments device 202 may include numerous detecting portions 206, each of which is configured to collect a different kind of environmental data. In some embodiments, a single detecting portion 206 may be capable of collecting different kinds of environmental data.

Device 202 may also include central processing unit (CPU) 208 and memory 210 to process data, such as the collected environmental data. CPU 208 may include one or more processors configured to execute computer program instructions to perform various processes and methods. CPU 208 may read the computer program instructions from memory 210 or from any computer-readable medium. Memory 210 may include random access memory (RAM) and/or read only memory (ROM) configured to access and store information and computer program instructions. Memory 210 may also include additional memory to store data and information, such as the collected environmental data, and/or one or more internal databases to store tables, lists, or other data structures.

I/O Unit 212 in device 202 may send the collected environmental data to another device for processing and/or storage. I/O Unit 212 may send the collected data over some type of network, such as a mesh network 102 and/or network 114.

Host 204 may include CPU 214, memory 216, database 218, and I/O Unit 220. Database 218 may store large amounts of data, and may include a magnetic, semiconductor, tape, optical, or other type of storage device.

CPU 214, memory 216, and I/O Unit 220 from host 204 may be similar to CPU 208, memory 210, and I/O Unit 212 from device 202. In some embodiments, CPU 214, memory 216, and I/O Unit 220 from host 204 may be more robust and have more capabilities than CPU 208, memory 210, and I/O Unit 212 from device 202. Indeed, host 204 may be a larger and more capable computer, whereas device 202 may be small and portable.

Block diagram 200 is one example configuration, and the number and components of the various entities shown may be different depending on specific embodiments. For example, in some embodiments, device 202 may not include CPU 208 and/or memory 210. In other embodiments, host 204 may be distributed over multiple entities, including other distribution systems, sensors, computers, handheld computers, mobile phones, tablet computers, or other computing platform. Device 202 may similarly be implemented or distributed over any computing platform. Thus, the configuration described in block diagram 200 is an example only and is not intended to be limiting.

Figure 3:
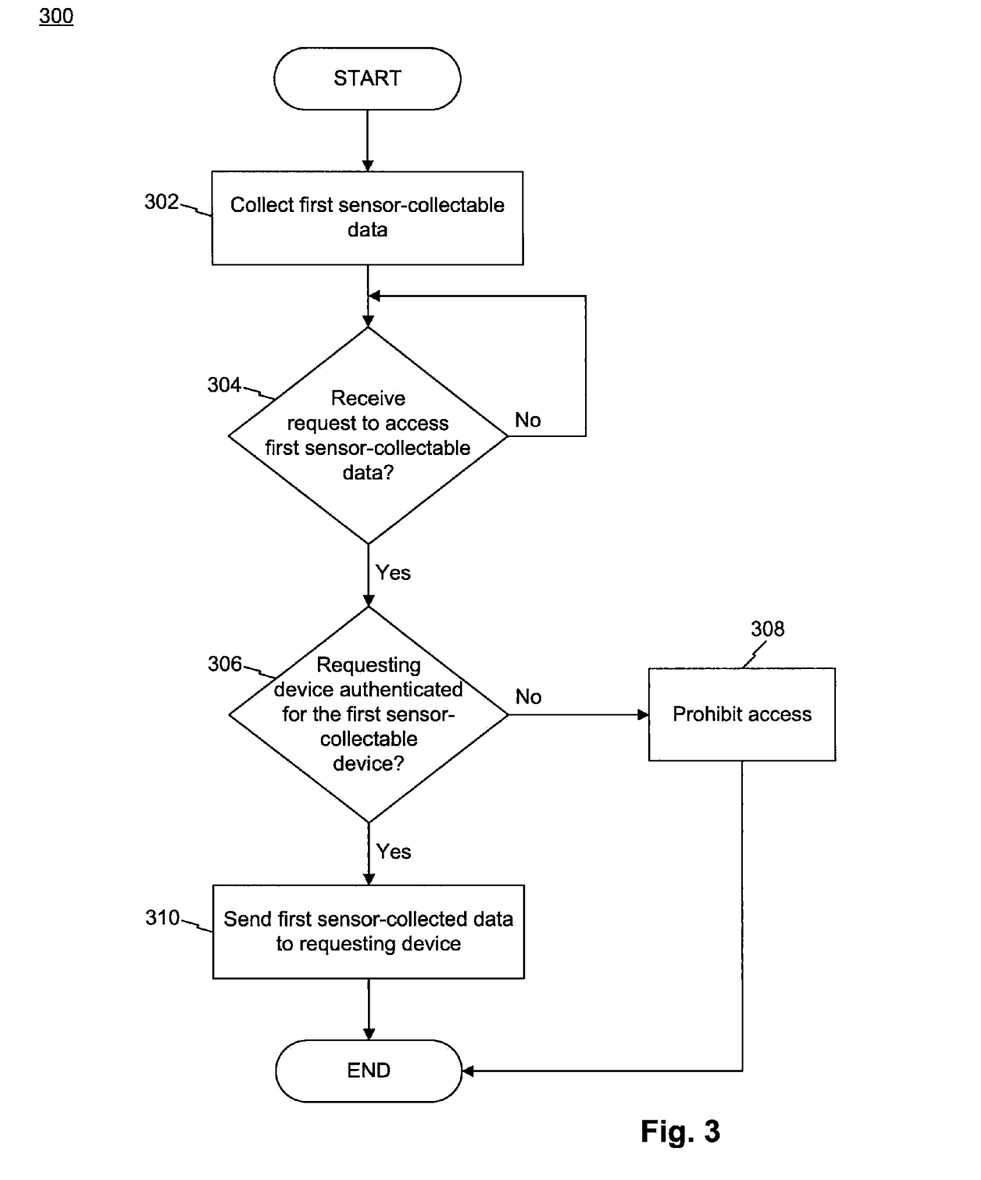
FIG. 3 is a flow chart of the operations of an exemplary method for sending sensor-collectable data from a sensor device to a requesting device

FIG. 3 is a flow chart of the operations of an exemplary method 300 for sending sensor-collectable data from sensor device 104 to requesting device 106. Method 300 may be performed by various components on sensor device 104. Method 300 may also be performed by other device, or in conjunction with other device, even ones not shown in system 100 or block diagram 200. In some configurations, some steps in method 300 are optional or can be rearranged. Further, additional steps can also be added to method 300.

Sensor device 104 may collect first sensor-collectable data using detecting portion 206 (step 302). The first sensor-collectable data may be about any environmental condition, for example, temperature data inside a package. Next, sensor device 104 may determine if it has received an external request to access the first sensor-collectable data using CPU 208 (step 304). The external request may come from requesting device 106.

If sensor device 104 does not receive such a request, it continues looping until it receives one. Alternatively, if sensor device does receive such a request, then it determines if requesting device 106 is authenticated to receive the first sensor-collectable data (step 306). Sensor device 104 may make this determination by examining a locally-stored list or other data structure stored in memory 210, for example.

Alternatively or additionally, sensor 104 may send a request to authentication host 110 to determine whether or not requesting device 106 is authenticated to access the first sensor-collectable data. Because authentication host 110 may have more processing power and storage, it may be advantageous to employ it in authenticating requesting device 106. This may allow for additional parameters to be used in authenticating requesting device 106. It may also be easier to update the data used to authenticate requesting device 106 using authentication host 110, or to add different types of data from third parties to do so.

If requesting device 106 is not authenticated to receive the first sensor-collectable data, then sensor device 104 may prohibit access to the first sensor-collectable data by requesting device 106 (step 308), after which exemplary method 300 may end. Alternatively, if requesting device is authenticated to receive the first sensor-collectable data, then sensor device 104 may send the first sensor-collectable data to requesting device 106 using I/O Unit 212 (step 310), after which exemplary method 300 may end.

Figure 4:
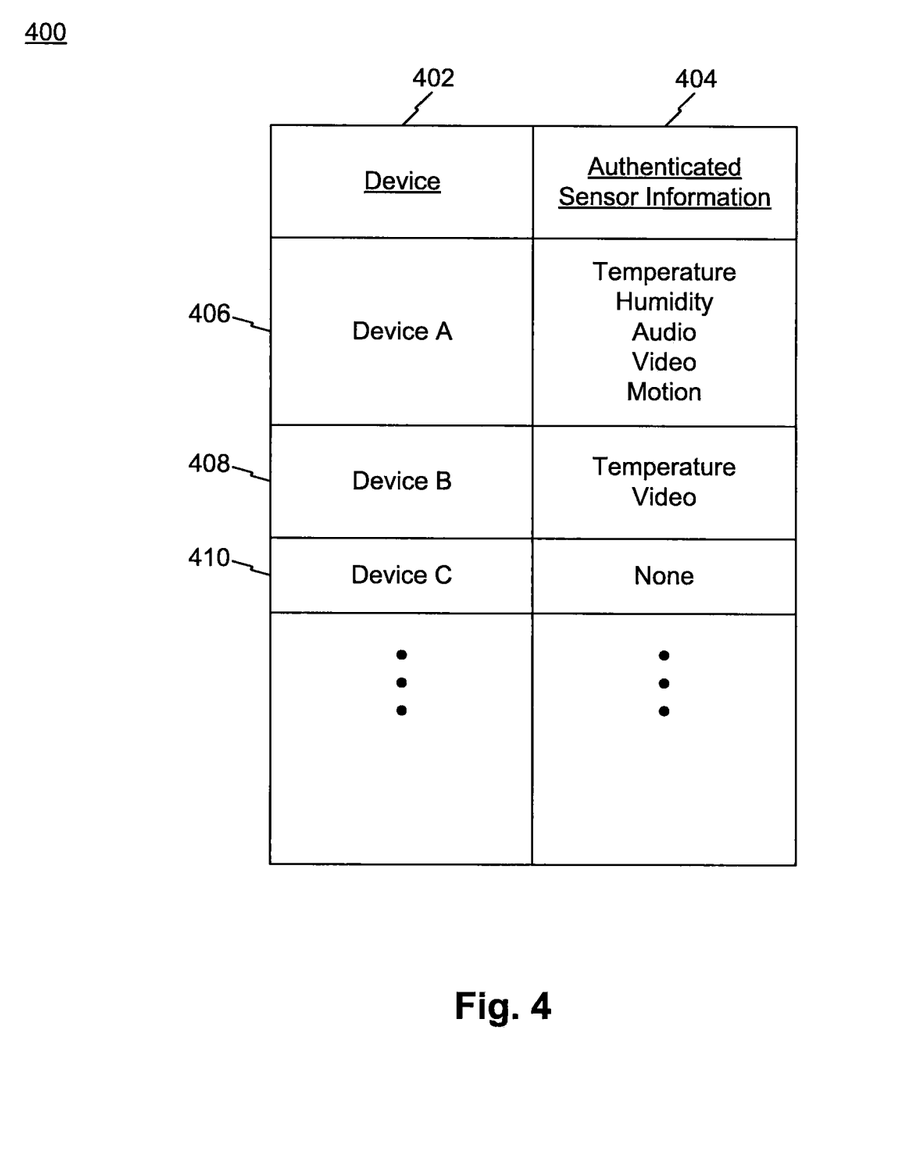
FIG. 4 illustrates a table for authenticating a requesting device.

FIG. 4 is an example of a table 400 used for authenticating requesting device 106. Table 400 may be stored on memory 210 of sensor device 104. Alternatively, table 400 may be stored on authentication host 110 in certain embodiments, or elsewhere.

In one example configuration, table 400 includes column 402 and 404. Column 402 lists known requesting devices or other identifiers associated with requesting devices. For example, column 402 may include a list of keys that a requesting devices may use to authenticate themselves. Alternatively, column 402 may list MAC addresses of requesting devices. Column 402 may also list ranges, types of devices, or other more generic identifiers as well. One of ordinary skill would understand that various static or dynamic identifiers may be used to authenticate requesting devices.

Column 404 of table 400 includes a list of different sensor-collectable data for which a particular device is authenticated. For example, row 406 states that device A is permitted to receive data about temperature, humidity, audio, video, and motion. Thus, when requesting device 106 requests one or more of these types of sensor-collectable data from sensor device 104, requesting device 106 is authenticated to receive them. Similarly, row 408 states that device B is permitted to receive data about temperature and video. Row 410, however, states that device C is not permitted to receive any type of sensor-collectable data. One of ordinary skill would understand that table 400 is just an example of how requesting device 106 may be authenticated and is not limiting. Alternatively, requesting device 106 may be authenticated based on an algorithm or a different data structure.

Figure 5:
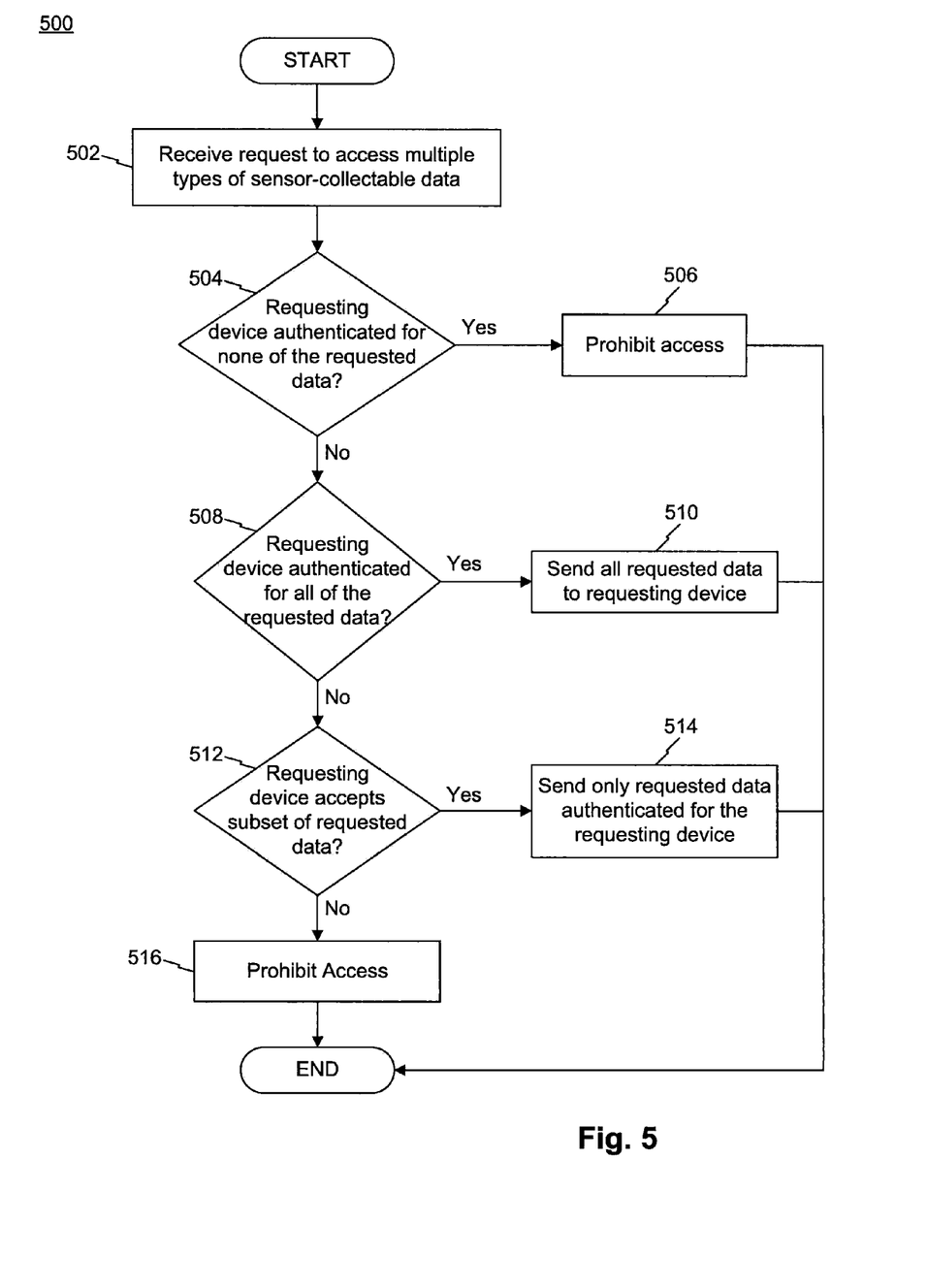
FIG. 5 is a flow chart of the operations of an exemplary method for sending sensor-collectable data from a sensor device to a requesting device, when the requesting device requests multiple types of sensor-collectable data.

FIG. 5 is a flowchart of the operations of an exemplary method 500 for sending sensor-collectable data from sensor device 104 to requesting device 106, when requesting device 106 requests multiple types of sensor-collectable data. Method 500 may be performed by various components on sensor device 104. Method 500 may also be performed by any other device, or in conjunction with other device, even ones not shown in system 100 or block diagram 200. In some configurations, some steps in method 500 are optional or can be rearranged. Further, additional steps can also be added to method 500.

Sensor device 104 may receive a request to access multiple types of sensor-collectable data using I/O Unit 212 (step 502). For example, sensor device 104 may determine that requesting device 106 has requested temperature, audio, video, and humidity data. Sensor device 104 may then determine if requesting device 106 is authenticated for none of the requested data using CPU 208 (step 504). In some embodiments, sensor device may consult table 400 to make this determination.

If sensor device 104 determines that requesting device 106 is not authenticated for any of the requested sensor-collectable data, then sensor device 104 may prohibit access to the requested sensor-collectable data using CPU 208 (step 506). For example, sensor device 104 may prohibit requesting device 106 from accessing the requested temperature, audio, video, and humidity data.

Alternatively, if sensor device 104 determines that requesting device 106 is authenticated for at least some of the requested sensor-collectable data, then sensor device 104 may determine whether requesting device 106 is authenticated for all of the requested data using CPU 208 (step 508). If requesting sensor 106 is authenticated for all of the requested data, sensor device 104 may send all requested data to requesting device 106 (step 510), after which method 500 ends. For example, sensor device 104 may send the requested temperature, audio, video, and humidity data to requesting device 106.

If, alternatively, sensor device 104 determines that requesting device 106 is not authenticated for all of the requested data, this may mean that requesting device 106 is authenticated for only a subset of the requested sensor-collectable data. For example, requesting device 106 may be authenticated to receive temperature and video data and not audio and humidity data. In this scenario, sensor device 104 may determine whether or not requesting device 106 will accept only a subset of the requested data using CPU 208 (step 516). For example, sensor device 104 may determine whether requesting device 106 would accept a partial fulfillment of its request: the requested temperature and video data but not the requested audio and humidity data. Requesting device 106 may have a general policy of accepting partial fulfillment or not, which sensor device 104 may be aware of. Alternatively, requesting device 106 may determine on a case-by-case basis whether it will accept a particular partial fulfillment of its request.

In some embodiments, instead of determining whether requesting device 106 accepts partial fulfillment of the requested data, sensor device 104 may conditionally deny the request. For example, sensor device 104 could inform requesting device 106 that its request is denied fully, but because certain of the requested data is not authenticated for requesting device 106. In this way, requesting device 106 may make an additional request, perhaps for higher-priority data that it needs. Alternatively, requesting device 106 may check back again in case the conditions for denying it access change.

If sensor device 104 determines that requesting device 106 will accept only a subset of its request, then sensor device 104 sends only the requested data that is authenticated to requesting device 106 using I/O Unit 212 (step 514). For example, sensor device 104 may send the requested temperature and video data, but not the requested audio and humidity data, to requesting device. Alternatively, if sensor device 104 determines that requesting device 106 will not accept only a subset of its request, then sensor device 104 prohibits access to all of the requested sensor-collectable data (step 516), after which method 500 ends.

Figure 6:
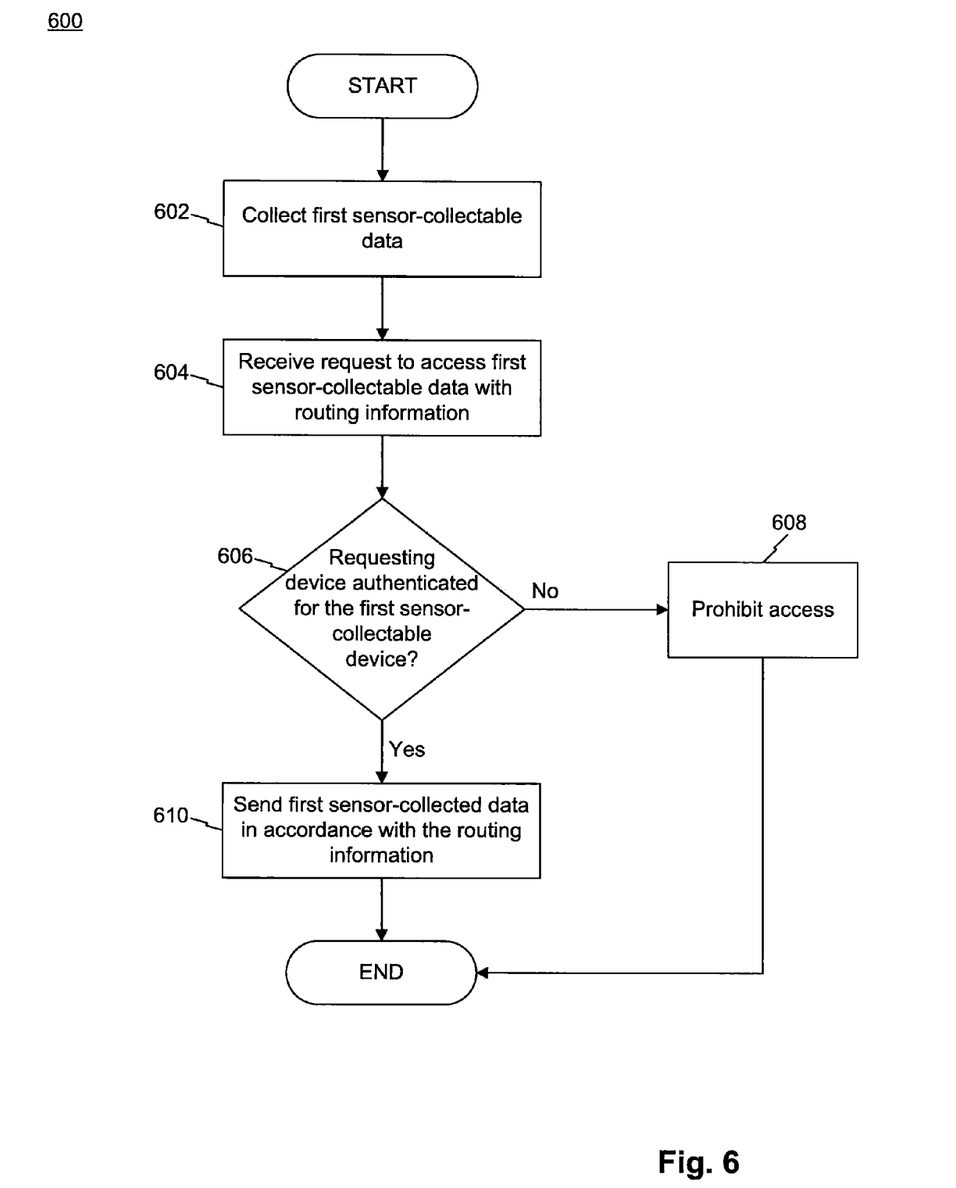
FIG. 6 is a flow chart of the operations of an exemplary method for sending sensor-collectable data from a sensor device to a destination in accordance with routing information provided by a requesting device.

FIG. 6 is a flow chart of the operations of an exemplary method 600 for sending sensor-collectable data from sensor device 104 to a destination in accordance with routing information provided by requesting device 106. Method 600 may be performed by various components on sensor device 104. Method 600 may also be performed by any other device, or in conjunction with any other device, even ones not shown in system 100 or block diagram 200. In some configurations, some steps in method 600 are optional and can be rearranged. Further, additional steps can also be added to method 600.

Sensor device 104 may collect first sensor-collectable data using detecting unit 206 (step 602). Sensor device 104 may then receive a request from requesting device 106, via I/O Unit 212, to access the first sensor-collectable data (step 604). The request may include routing information. Routing information may indicate a destination for the first sensor-collectable data, such as sensor-data host 112. In some embodiments, requesting device 106 may be in a location that does not allow for the storage and/or processing of the first sensor-collectable data. For example, requesting device 106 may be in a country that prohibits the storage of certain types of audio and/or video information. Thus, requesting device 106 may instruct sensor device 104 to provide the first sensor-collectable data to another location, such as sensor-data host 112. Sensor-data host 112 may be in a location that does not have restrictions on storing and/or processing the first sensor-collectable data.

In some embodiments, the routing information may serve to combat congestion in a network. For example, requesting device 106 may be aware of congestion in certain parts of the network, and may instruct sensor device 104 to send the first sensor-collectable data via a different route in the network. These instruction may be in the routing information that requesting device 106 may send to sensor device 104.

After receiving the request, sensor device 104 may determine whether or not the requesting device 106 is authenticated to receive, request, or have access to the first sensor-collectable data (step 606). Alternatively or additionally, sensor device 104 may determine if sensor-data host 112 is authenticated to receive, request or have access to the first sensor collectable data. If requesting device 106 and/or sensor-data host 112 is not authenticated, then sensor device 104 may prohibit access to the first sensor-collectable data (step 608), after which method 600 may end.

Alternatively, if requesting device 106 and/or sensor-data host 112 is authenticated, then sensor device 104 may send the first sensor-collectable data in accordance with the routing information (step 610) using I/O Unit 212, after which method 600 may end. For example, sensor device 104 may route the first sensor-collectable data to sensor-data host 112. And in some embodiments, sensor device 104 may route the first sensor-collectable data to avoid network congestion.

Figure 7:
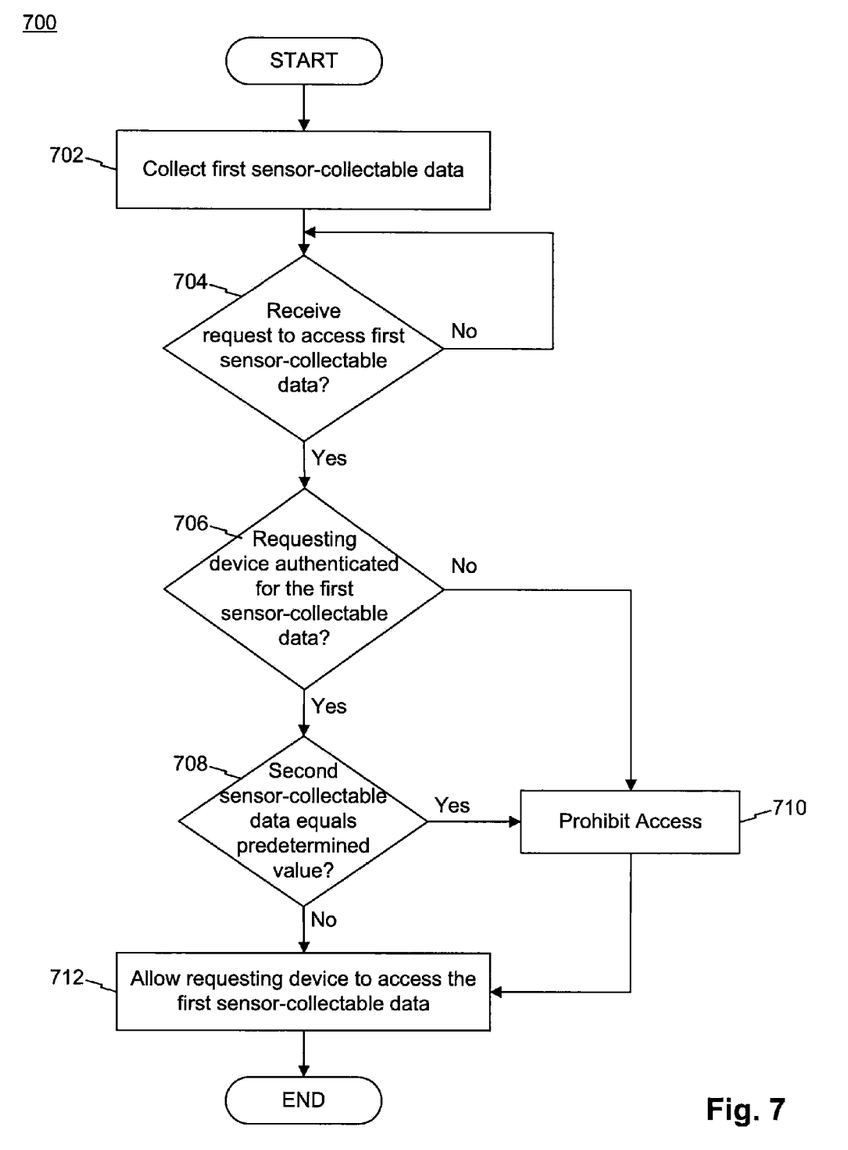
FIG. 7 is a flow chart of the operations of an exemplary method for sending sensor-collectable data from a sensor device to a requesting device, if certain sensor-collectable data is associated with a particular value or range.

FIG. 7 is a flow chart of the operations of an exemplary method 700 for sending sensor-collectable data from sensor device 104 to requesting device 106, if certain sensor-collectable data is associated with a particular value or range. Method 700 may be performed by various components on sensor device 104. Method 700 may also be performed by any other device, or in conjunction with any other device, even ones not shown in system 100 or block diagram 200. In some configurations, some steps in method 700 are optional or can be rearranged. Further, additional steps can also be added to method 700.

Disclosed embodiments may relate to prohibiting access to first sensor-collectable data depending on a value of second sensor-collectable data. For example, requesting device 106 may request first sensor-collectable data, for example, temperature data, from sensor device 104. Requesting device 106 may be authenticated to receive the temperature data. Requesting device 106, however, may include a detecting portion 206, which enables it to collect its own second sensor-collectable data, such as GPS location information. Sensor device 104 may analyze this second sensor-collectable data (e.g., location information), and may determine that requesting device 106 may be located in a jurisdiction with rules prohibiting storage or access to temperature information. Accordingly, even though requesting device 106 may be authenticated to access the first sensor-collectable data (e.g., temperature), sensor device 104 may nonetheless prohibit access because second sensor-collectable data (e.g., requesting device 106's location) is associated with a predetermined value (e.g., a jurisdiction prohibiting collection of temperature data).

In some embodiments, the second sensor-collectable data may be also collected at sensor device 102. For example, the second sensor collectable data may be similar to or the same as the first sensor-collectable data collected at sensor device 102. In some embodiments, certain parties may not wish to share the first sensor-collectable data if it is outside of a certain range. A transport company, for example, may not need to report temperature data unless it is in a critical range.

Thus, even though the requesting device 106 may be authenticated to access the first sensor-collectable data (e.g., temperature data), sensor device 104 may still not make this data accessible, because it is not in a predetermined range.

Alternatively, the second sensor-collectable data may be collected by sensor device 102, but may be different from the first sensor-collectable data. For example, a transportation company may not want to publish or report temperature data unless the humidity level is within a certain range. The temperature data may not be meaningful or critical, in this example, unless the humidity level is also in a certain range. In these situations, even though the requesting device 106 may be authenticated to receive the first sensor-collectable data (e.g., temperature), sensor device 104 may still not make this data accessible, because second sensor-collectable data (e.g., humidity) it is not in a predetermined range.

Referring back to FIG. 7, sensor device 104 may collect first sensor-collectable data using detecting unit 206 (step 702). Next, sensor device 104 may receive, from requesting device 106, a request to access the first sensor-collectable data (step 704). If sensor unit has not received such a request, it may continue checking until it does receive such a request. Alternatively, if sensor device 104 does receive the request, then it may determine if the requesting device is authenticated to receive the first sensor-collectable data using CPU 208 (step 706).

If requesting device 106 is not authenticated, then sensor device 104 may prohibit access by requesting device 106 to the first sensor-collectable data using CPU 208 (step 710), after which method 700 may end. Alternatively, if the requesting device 106 is authenticated, then sensor device 104 may determine if second sensor-collectable data equals or is otherwise associated with a predetermined value or range using CPU 208 (step 708). If the second sensor-collectable data is associated with the predetermined value/range, then sensor device 104 may prohibit access by requesting sensor 106 to the first sensor collectable data using CPU 208 (step 710), after which method 700 may end.

Alternatively, if the second sensor-collectable data is not associated with the predetermined value/range, then sensor device 104 may allow requesting device 106 to access the first sensor-collectable data using I/O Unit 212 (step 712), after which method 700 may end. For example, sensor device 104 may send the second sensor-collectable data to requesting device 106.

While certain features and embodiments of the invention have been described, other embodiments of the invention will be apparent to those skilled in the art from consideration of the specification and practice of the embodiments of the invention disclosed herein. Furthermore, although aspects of embodiments of the present invention have been described in part as software, computer-executable instructions, and/or other data stored in memory and other storage mediums, one skilled in the art will appreciate that these aspects can also be stored on or read from other types of tangible, non-transitory computer-readable media, such as secondary storage devices, like hard disks, floppy disks, or a CD-ROM, or other forms of RAM or ROM. Further, the steps of the disclosed methods may be modified in various ways, including by reordering steps and/or inserting or deleting steps, without departing from the principles of the invention.

It is intended that the specification and examples be considered as exemplary only, with a true scope and spirit of the invention being indicated by the following claims.

What is claimed is:

1. A method for distributing sensor data, the method comprising:
   receiving, from a requesting device, a request to access first sensor-collectable data associated with at least one package, wherein the requesting device is authenticated to access the first sensor-collectable data, wherein the request for access to the first sensor-collectable data comprises routing information, and wherein the routing information indicates a sensor-data host different than the requesting device; and
   determining whether to deny the request to access the first sensor-collectable data based, at least in part, on second sensor-collectable data indicative of a location associated with a prohibition on access to the first sensor-collectable data.

2. The method of claim 1, wherein the requesting device comprises a sensor.

3. The method of claim 2, wherein the second sensor-collectable data is collected by the sensor of the requesting device.

4. The method of claim 1, further comprising:
   denying the request for access based on the requesting device being located in a jurisdiction prohibiting access of the first sensor-collectable data.

5. The method of claim 1, the method further comprising:
   collecting the first sensor-collectable data at a sensor device, wherein the sensor device is in proximity to the at least one package; and
   collecting the second sensor-collectable data at the sensor device.

6. The method of claim 1, further comprising:
   accessing an authentication host over a network to authenticate the requesting device for the first sensor-collectable data.

7. The method of claim 1, further comprising:
   accessing a local pre-configured list to authenticate the requesting device for the first sensor-collectable data.

8. The method of claim 1, wherein if the request for access is granted, the method further comprises:
   sending the first sensor-collectable data to the sensor-data host in accordance with the routing information.

9. The method of claim 1, wherein the first sensor-collectable data describes environmental conditions of the at least one package.

10. A non-transitory computer-readable medium storing program instructions, which, when executed by a processor, cause the processor to perform a method for distributing sensor data, the method comprising:
    receiving, from a requesting device, a request to access first sensor-collectable data associated with at least one package, wherein the requesting device is authenticated to access the first sensor-collectable data, wherein the request for access to the first sensor-collectable data comprises routing information, and wherein the routing information indicates a sensor-data host different than the requesting device; and
    determining whether to deny the request to access the first sensor-collectable data based, at least in part, on second sensor-collectable data indicative of a location associated with a prohibition on access to the first sensor-collectable data.

11. The computer-readable medium of claim 10, wherein the requesting device comprises a sensor.

12. The computer-readable medium of claim 11, wherein the second sensor-collectable data is collected by the sensor of the requesting device.

13. The computer-readable medium of claim 10, the method further comprising:

denying the request for access based on the requesting device being located in a jurisdiction prohibiting access of the first sensor-collectable data.

14. The computer-readable medium of claim 10, the method further comprising:
collecting the first sensor-collectable data at a sensor device, wherein the sensor device in proximity to the at least one package; and
collecting the second sensor-collectable data at the sensor device.

15. The computer-readable medium of claim 10, the method further comprising:
accessing an authentication host over a network to authenticate the requesting device for the first sensor-collectable data.

16. The computer-readable medium of claim 10, the method further comprising:
accessing a local pre-configured list to authenticate the requesting device for the first sensor-collectable data.

17. The computer-readable medium of claim 10, wherein if the request for access is granted, the method further comprises:
sending the first sensor-collectable data to the sensor-data host in accordance with the routing information.

18. The method of claim 10, wherein the first sensor-collectable data describes environmental conditions of the at least one package.

19. A device for distributing sensor data, the device comprising:
an I/O unit configured to receive, from a requesting device, a request to access first sensor-collectable data associated with at least one package, wherein the requesting device is authenticated to access the first sensor-collectable data, wherein the request for access to the first sensor-collectable data comprises routing information, and wherein the routing information indicates a sensor-data host different than the requesting device; and
a processor configured to determine whether to deny the request to access the first sensor-collectable data based, at least in part, on second sensor-collectable data indicative of a location associated with a prohibition on access to the first sensor-collectable data.

20. The device of claim 19, wherein the requesting device comprises a sensor.

21. The device of claim 20, wherein the second sensor-collectable data is collected by the sensor of the requesting device.

22. The device of claim 19, wherein the processor is further configured to:
deny the request for access based on the requesting device being located in a jurisdiction prohibiting access of the first sensor-collectable data.

23. The device of claim 19, further comprising a detecting portion configured to:
collect the first sensor-collectable data in proximity to the at least one package; and
collect the second sensor-collectable data.

24. The device of claim 19, wherein the I/O unit is further configured to:
access an authentication host over a network to authenticate the requesting device for the first sensor-collectable data.

25. The device of claim 19, wherein the processor is further configured to:
access a local pre-configured list to authenticate the requesting device for the first sensor-collectable data.

26. The device of claim 19, wherein if the request for access is granted, the processor is further configured to:
send the first sensor-collectable data to the sensor-data host from the I/O unit in accordance with the routing information.

27. The device of claim 19, wherein the first sensor-collectable data describes environmental conditions of the at least one package.

* * * * *